United States Patent [19]

Gerlock et al.

[11] Patent Number: 5,487,914
[45] Date of Patent: Jan. 30, 1996

[54] METHOD OF ADDING UV LIGHT ABSORBERS INTO POLYMERIC SUBSTRATES

[75] Inventors: John L. Gerlock, Dearborn; Mark P. Everson, Canton, both of Mich.

[73] Assignee: Ford Motor Company, Dearborn, Mich.

[21] Appl. No.: 316,744

[22] Filed: Oct. 3, 1994

[51] Int. Cl.⁶ .............................. B05D 3/62; B05D 3/10; B32B 35/00
[52] U.S. Cl. .......................... 427/140; 427/142; 427/334; 427/336; 427/375
[58] Field of Search ..................................... 427/334, 142, 427/336, 155, 140, 375

[56] References Cited

U.S. PATENT DOCUMENTS

| | | |
|---|---|---|
| 3,297,462 | 1/1967 | Fanning . |
| 3,715,227 | 2/1973 | Alburger ..................................... 427/8 |
| 4,146,658 | 3/1979 | Humphrey ............................... 427/160 |
| 4,265,936 | 8/1978 | Prohaska, Jr. . |
| 4,315,957 | 2/1982 | Hereth et al. ............................. 427/155 |
| 4,322,455 | 3/1982 | Olson et al. ............................. 427/160 |
| 4,323,597 | 4/1982 | Olson et al. ............................. 427/160 |
| 4,355,071 | 10/1982 | Chang . |
| 4,997,478 | 3/1991 | Gordon . |
| 5,064,688 | 11/1991 | Trifon . |
| 5,085,903 | 2/1992 | Kapp et al. ............................... 427/160 |
| 5,110,626 | 5/1992 | Burchill et al. .......................... 427/336 |
| 5,110,634 | 5/1992 | Silbermann et al. .................... 427/336 |
| 5,141,555 | 8/1992 | Elepano . |
| 5,209,871 | 5/1993 | Mason . |
| 5,265,417 | 11/1993 | Visser . |
| 5,279,862 | 1/1994 | Corcoran . |
| 5,288,314 | 2/1994 | Howard et al. . |
| 5,368,894 | 11/1994 | Lammers et al. ....................... 427/336 |

FOREIGN PATENT DOCUMENTS 3-195780  8/1991  Japan .

*Primary Examiner*—Diana Dudash
*Attorney, Agent, or Firm*—Lorraine S. Melotik; Roger L. May

[57] ABSTRACT

This invention is a method for providing ultraviolet light absorbers into a cured polymeric material such as paint which comprises the steps of providing a coating of a composition comprising ultraviolet light absorber (UVA) on the polymeric material and heating the UVA containing coating to an elevated temperature for a time sufficient to cause the UVA to diffuse into the cured polymeric material.

6 Claims, 1 Drawing Sheet

METHOD OF ADDING UV LIGHT ABSORBERS INTO POLYMERIC SUBSTRATES

TECHNICAL FIELD

This invention is related to a method to provide ultraviolet light absorbers into polymeric material substrates, like cured paint coatings.

BACKGROUND OF THE INVENTION

The long term weatherability of automotive paint on a vehicle is dependent in large part on the ability of ultraviolet light absorber additives contained in the clearcoat to shield underlying layers from ultraviolet (UV) light. For this reason, UV light absorbers (UVA) such as benzotriazoles are routinely added into the clearcoat composition. However, with time, these UV absorbers may be chemically broken down or migrate out of the clearcoat. The result is that the clearcoat itself and underlying layers are subject to photo-degradation which breaks down their properties, e.g., the paint loses its gloss.

Generally, polishes are periodically applied on an automobile paint surface to revitalize its gloss and increase its water repellency. One such topical treatment is disclosed in U.S. Pat. No. 5,288,314 to Howard et al. and contains dye, solvent, UV additive and a number of other components including silicone. The need to frequently reapply automotive polishes to revitalize paint gloss is indicative of their temporary and topical nature. In some situations, if the paint has degraded substantially, the automobile may be provided with a new coat of paint. It would be desirable if a method could be employed to replenish UVAs into the paint or clearcoat to provide continuing effective UV degradation resistance to the paint. The present invention provides such a method.

DISCLOSURE OF THE INVENTION

This invention is directed to a method for providing ultraviolet light absorbers into a polymeric substrate, which method comprises the steps of:

providing a coating, on the polymeric substrate, of a composition comprising ultraviolet violet absorber suspended in a non-reactive carrier; and heating the coating to an elevated temperature above about 50° C. for a time sufficient to cause UVA to diffuse into the substrate.

The composition may be, e.g., in liquid or wax form. Optionally, the composition may include a substantially non-volatile solvent capable of swelling the substrate during heating.

DETAILED DESCRIPTION OF PREFERRED EMBODIMENTS

Figure 1:
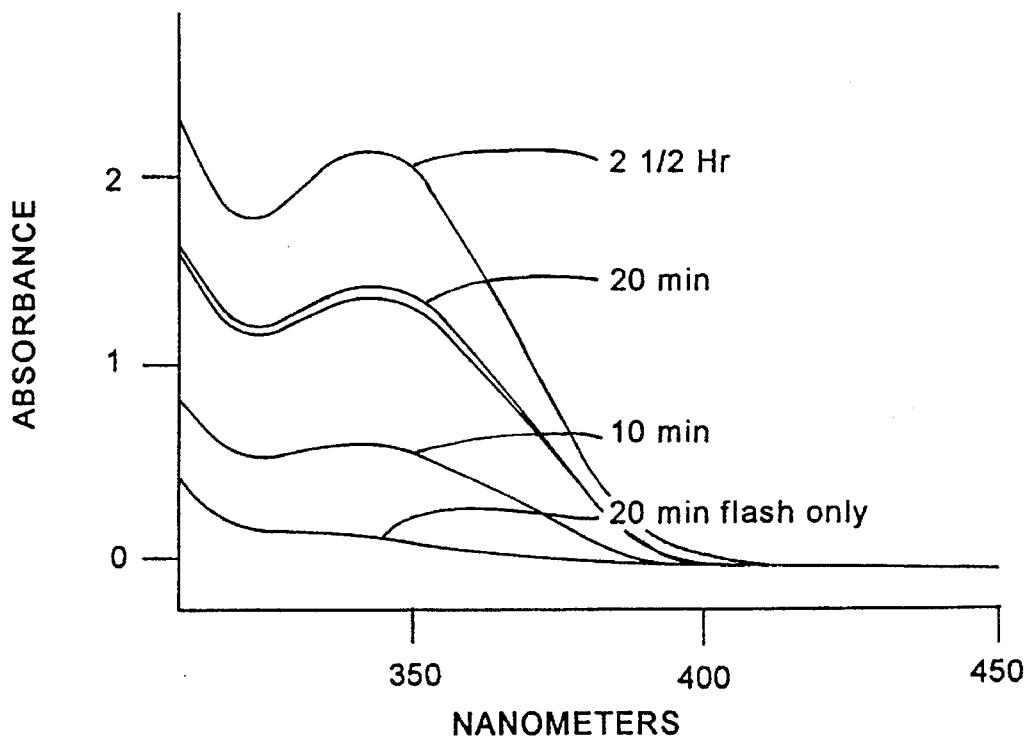
FIG. 1 is a graph which shows the absorbance of Tinuvin 384 as a function of bake time for a paint treated according to one embodiment of the method invention.

The method of this invention allows for ultraviolet light absorbers (UVAs) to be replenished back into a polymeric material, e.g., a thermoset material like a paint, any time after it has been applied to an article and cured. As discussed above, during paint use, UVAs can be lost from the paint by migration or the UVAs can lose their effectiveness due to degradation of the UVA upon exposure to UV light in the environment. One particularly desirable use for the invention method is to replenish UVAs into paints, i.e., after the paint has been applied to the car and the cured paint coating has experienced exposure in the environment to UV light. As would be apparent in view of this disclosure, however, the method is not so limited.

In addition to paints, other polymeric materials, such as thermoset or thermoplastics, which would benefit from having UVA replenished or added into the material for the first time can be subjected to the invention method. Paint coatings, which would benefit from the present method, are readily apparent to those skilled in the art in view of the present disclosure and include those used as basecoats and clearcoats in automotive applications. Exemplary of such automotive paints are acrylic/melamine, acrylic/urethane, polyester/urethane, and epoxy/acid type paints. Plastics available for use in this invention, include but are not limited to plastics such as polypropylene and polyethylene. Exemplary of such plastics which would benefit from the invention method are those used in the manufacture of outdoor furniture, boats, and vinyl siding.

The replenishing composition comprises, at a minimum, ultraviolet light absorber and non-reactive carrier, i.e., substantially non-reactive toward the UV absorber or the polymer. This carrier may be a liquid, wax, or other low melting solid (i.e., having a melting point below about 50° C.), but is preferably a liquid because it optimally insures intimate contact between the carrier and the polymeric material substrate, e.g., the paint layer, during the invention method. The particular carrier is not critical to the invention method as long as it wets the polymeric material surface during the invention method. Exemplary useful carriers include, but are not limited to, xylene, hexadecane, ethylene glycol, petroleum jelly, and wax such as automotive paint wax like Caranuba wax.

The UVAs included in the composition may be any such additives, or mixture of UVA, many of which are well known in the art. Exemplary of such materials are benzotriazoles, such as Tinuvin 1130, Tinuvin P, and Tinuvin 384 (trademarks, CIBA GEIGY), the last being most preferred; ortho-hydroxybenzophenones; triphenyltriazines; and oxanilides. Particularly preferred of such materials are the benzotriazoles. In order to form the composition, the UVAs are mixed with the other materials of the composition according to any technique, the particular mixture nor processing being critical to this invention.

Generally the UVA comprises at least 10 volume percent of the composition, based on the total volume of the composition and may even comprise almost substantially all of the composition. Preferably, the UVA comprises between about 10 and 30 volume percent of the composition.

It has also been found useful to optionally include other materials in the composition, for example, a substantially non-volatile solvent capable of slightly swelling at least the surface region of the polymeric material substrate, e.g., the paint, when the composition and the substrate are subjected to the elevated temperatures of the method, one solvent being glycerine. Still other materials which may be included in the composition include, for example, hindered amine light stabilizer (HALS) additives which increase the life of polymeric materials like paint by scavenging free radicals from within the paint from photo degradation and other causes. Such HALS additives in the composition are also subject to diffusion into the polymeric substrate.

According to the method, the polymeric substrate to be treated according to the present invention method is provided with a coating of the composition containing the UVA. Generally, the thickness of the coating composition so provided is preferably between about 0.5 and 2 mils, although the optimal chosen thickness will be dependent on several factors including UVA concentration in the composition, and would be within the skill of one in the art in view of the present disclosure. The method of providing the coating of the composition is dependent in part on the composition characteristics, i.e., liquid or wax, and is not critical to the invention. According to the present method, the composition coating is then heated to an elevated temperature above about 60° C. for a time sufficient to cause UVA present in the composition to diffuse into the polymeric material substrate, e.g., the paint. As would be apparent in view of the present disclosure, the polymeric material substrate, at least in its surface region near the applied coating of the UVA composition, will also be heated to the elevated temperature which works to help the UVAs diffuse into the polymeric material. It is believed that to practice the invention, preferably for optimal effeciency in diffusing the UVA into the polymeric material, it should be heated above its Tg. According to the present invention method, UVA in the composition diffuses into the substrate and is not just present as a surface coating on the substrate. Abrasion tests determined that a significant amount of the UVA migrated into the substrate generally to a depth of about 1 mil. The time for heating the composition, depends on the composition characteristics (e.g., whether it is a liquid or wax, whether it also contains a swelling solvent) and tile temperature of heating. If a swelling solvent is employed, the material and composition can be heated to a lower temperature than if no solvent is employed. Preferably for most optimal diffusion with paint coatings, the temperature of heating is above about 80° C., and that temperature is maintained for at least about 30 minutes. The time can be extended to even one hour or more, while practicing this invention. The optimal parameters of a particular embodiment of the method, based on the composition, temperature and time of heating, type of substrate material, and amount of UVA desired in the polymeric material could be routinely determined in view of the present disclosure.

Following diffusion of UVA into the polymeric material substrate, the residual composition material can be left on the substrate or removed as by washing. If desired, the method of the invention could be repeated at that time or at a later time.

EXAMPLE

Tinuvin 384 was applied in liquid form (the carrier being xylene and comprising about 5% of the composition) onto an acrylic/melamine paint coating, allowed to sit at room temperature for 20 minutes, and then heated at 90° C. In the first two hours of heating, UVA absorbance of the paint reached 2.0 at 340 nm as determined by impinging UV light from a spectrometer on the paint. An absorbance of UV light of 2.0 at 340 nm shields underlying paint layers from 99% of the UV light at 340 nm. This absorbance as a function of heating (bake) time is shown in FIG. 1. From the lowest curve to the highest, the bake times are 0 min, 10 min, 20 min, and 150 min.

Figure 2:
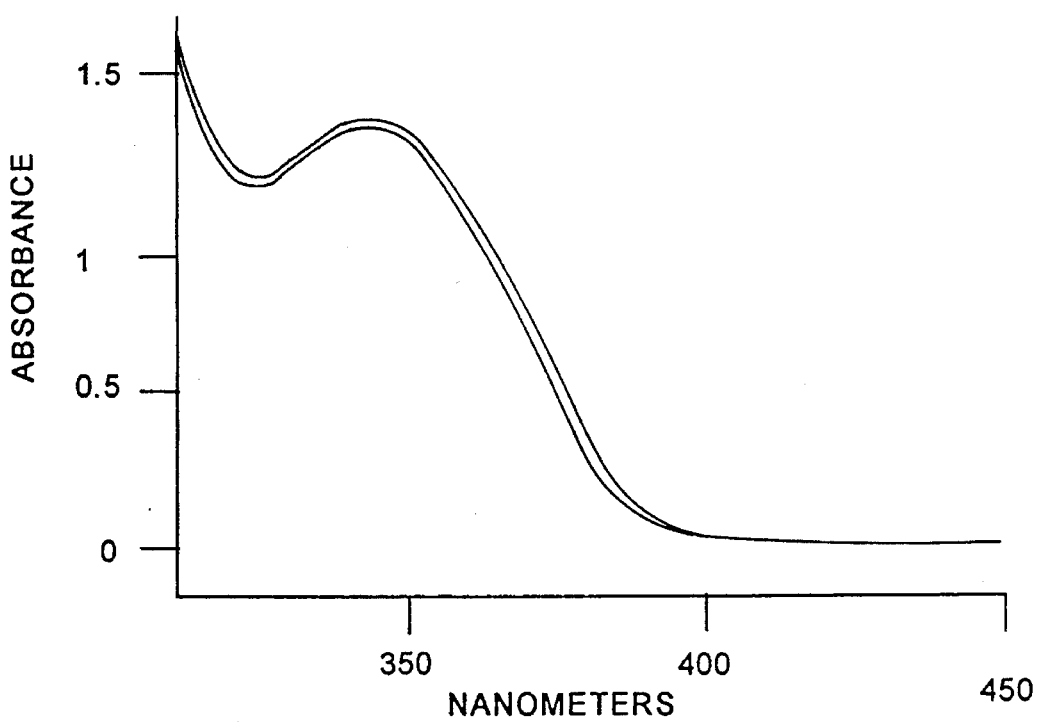
FIG. 2 is a graph which shows the thermal stability of the diffused Tinuvin 384 of FIG. 1 with time.

The thermal stability of the above diffused-in Tinuvin 384 was very good as shown in FIG. 2. The upper curve was that immediately after diffusion of the UVA according to the method above, and the lower curve was that after a 6-day thermal treatment. That is, after a 6-day 90° C. thermal treatment, the UV spectrum is basically unchanged from that taken immediately after the diffusion invention method. This desirably indicated that the diffused-in UVA species remained in the paint.

In view of this disclosure, many modifications of this invention will be apparent to those skilled in the art. It is intended that all such modifications which fall within the true scope of the invention will be included within the terms of the appended claims.

We claim:

1. A method for providing ultraviolet light absorbers into a cured automotive paint, which method comprises the steps of:

providing a coating, on said paint, of a composition comprising ultraviolet light absorber suspended in a non-reactive carrier;

heating said coating to an elevated temperature above about 60° C. for a time sufficient to cause said ultraviolet light absorber to diffuse into said paint.

2. The method according to claim 1 which comprises the further step of removing said carrier present on said substrate after said heating step.

3. The method according to claim 1 wherein said composition further comprises a solvent capable of swelling said polymeric substrate during said heating step.

4. The method according to claim 1 wherein said ultraviolet light absorber is present in said composition in an amount of at least 10 volume percent.

5. The method according to claim 1 wherein said carrier is selected from a liquid, a wax or other low melting having a melting point below about 50° C.

6. The method according to claim 1 wherein said ultraviolet light absorber is selected from the group consisting of benzotriazoles, ortho-hydroxybenzophenones, triphenyl triazines and oxyanilides.

\* \* \* \* \*